(12) United States Patent
Chiou et al.

(10) Patent No.: US 12,490,405 B2
(45) Date of Patent: Dec. 2, 2025

(54) MULTI-FAN CONTROL SYSTEM

(71) Applicant: ANPEC ELECTRONICS CORPORATION, Hsinchu (TW)

(72) Inventors: Ruei-Hung Chiou, Hsinchu (TW); Wei-Chih Wang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 385 days.

(21) Appl. No.: 18/206,126

(22) Filed: Jun. 6, 2023

(65) Prior Publication Data

US 2024/0334643 A1 Oct. 3, 2024

(30) Foreign Application Priority Data

Mar. 27, 2023 (TW) .................................. 112111411

(51) Int. Cl.
*H05K 7/20* (2006.01)

(52) U.S. Cl.
CPC ..... *H05K 7/20209* (2013.01); *H05K 7/20136* (2013.01)

(58) Field of Classification Search
CPC ........... G06F 16/2322; G06F 2201/805; G06F 9/30043; G06F 1/20; G06F 1/3225; G06F 1/203; G06F 11/201; G06F 11/2089; G06F 11/3058; G06F 9/30079; G06F 9/5005; G06F 3/0679; G06F 3/0673; G06F 3/0658; G06F 3/0634; G06F 1/00; G06F 1/206; G05B 2219/25157; H03M 13/09; H02P 6/08; H02P 6/20; H02P 6/28; H02P 7/29; H02P 27/08; H02P 25/03; H02P 1/54; H02P 1/56; H02P 1/58; F04D 25/166; F04D 27/005; F04D 29/4226; F04D 29/526; F04D 29/626; F04D 29/5806; F04D 29/5813; G05D 23/00; H05K 7/20136; H05K 7/20209
See application file for complete search history.

(56) References Cited

U.S. PATENT DOCUMENTS 9,188,355 B1 * 11/2015 Allen .................... F24F 11/77
2017/0246741 A1 8/2017 Kobayashi et al.

* cited by examiner

*Primary Examiner* — Antony M Paul
(74) *Attorney, Agent, or Firm* — Li & Cai Intellectual Property (USA) Office

(57) ABSTRACT

A multi-fan control system is provided. A controller, within each of a plurality of time intervals, outputs a control signal including a reading command to one of a plurality of fans, and outputs a control signal including a writing command to another of the plurality of fans. The controller, within each of the plurality of time intervals, only reads operation state data of the one of the plurality of fans that receives the control signal including the reading command, and writes operation control commands respectively into the plurality of fans.

20 Claims, 8 Drawing Sheets

| Preamble | Starting | Identification code | Parity Checksum Code | Stopping | Starting | Address | Reading/Writing | Parity Checksum Code | Stopping | Starting | Information | Parity Checksum Code | Stopping |

FIG. 8

| Preamble | Starting | Identification code | Parity Checksum Code | Stopping | Starting | Address | Reading/Writing | Parity Checksum Code | Stopping |

FIG. 7

| Preamble | Starting | Identification code | Parity Checksum Code | Stopping | Starting | Information | Parity Checksum Code | Stopping |

FIG. 6

MULTI-FAN CONTROL SYSTEM

CROSS-REFERENCE TO RELATED PATENT APPLICATION

This application claims the benefit of priority to Taiwan Patent Application No. 112111411, filed on Mar. 27, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a fan, and more particularly to a multi-fan control system.

BACKGROUND OF THE DISCLOSURE

A plurality of fans are often used to cool heat generating components in electronic equipments. In particular, the fans are often used synchronously for quickly cooling down a large-size equipment. However, a conventional controller is not able to effectively control the plurality of fans to instantly reduce temperatures of the heat generating components in the electronic equipments. As a result, the heat generating components and other circuit components in the electronic equipment can be damaged due to overheating.

SUMMARY OF THE DISCLOSURE

In response to the above-referenced technical inadequacies, the present disclosure provides a multi-fan control system. The multi-fan control system includes a controller and a plurality of fans. The controller is configured to output a plurality of control signals within each of a plurality of time intervals. The fans are connected to the controller. One of the plurality of control signals that are respectively outputted to the plurality of fans by the controller within each of the plurality of time intervals includes a reading command. Another of the plurality of control signals that are outputted respectively to the plurality of fans by the controller within each of the plurality of time intervals includes a writing command and an operation control command. Within each of the plurality of time intervals, only one of the plurality of fans that receives the reading command provides a feedback signal to the controller according to operational state data of the one of the plurality of fans. The controller reads the operational state data of the one of the plurality of fans. The controller reads the operational state data of the plurality of fans respectively within the plurality of time intervals. Within each of the plurality of time intervals, the another of the plurality of fans receives and stores the writing command and the operation control command from the controller.

In certain embodiments, within each of the plurality of time intervals, the one of the plurality of fans that receives the reading command also receives and stores the operation control command from the controller.

In certain embodiments, the controller sets the reading command to be represented by parameters of N ones of a plurality of waveforms of the one of the plurality of control signals, where N is a positive value. The controller sets the writing command to be represented by parameters of M ones of a plurality of waveforms of the another of the plurality of control signals, where M is a positive value.

In certain embodiments, the controller sets the reading command to be represented by frequencies of N ones of a plurality of waveforms of the one of the plurality of control signals, where N is a positive value. The controller sets the writing command to be represented by frequencies of M ones of a plurality of waveforms of the another of the plurality of control signals, where M is a positive value.

In certain embodiments, each of the plurality of fans rotates according to working periods of the plurality of waveforms of the control signal from the controller. Each of the plurality of fans, according to the frequencies of some of the plurality of waveforms of the control signal from the controller, determines whether or not the control signal from the controller includes the reading command or the writing command.

In certain embodiments, within each of the plurality of time intervals, one of the plurality of fans that receives the reading command sets the operational state data of the one of the plurality of fans to be represented by working periods of F ones of a plurality of waveforms of the feedback signal, where F is a positive value.

In certain embodiments, each of the plurality of control signals includes P bit values for representing a preamble, where P is a positive value. The feedback signal outputted by each of the plurality of fans includes the P bit values for representing the preamble.

In certain embodiments, the controller sets an identification code of each of the plurality of fans to be represented by D bit values included in the control signal outputted to each of the plurality of fans, where D is a positive value. The identification code of each of the plurality of fans is represented by the D bit values included in the feedback signal outputted by each of the plurality of fans. The D bit values representing the identification code of each of the plurality of fans appear later than the P bit values representing the preamble. The identification codes of the plurality of fans are different from each other.

In certain embodiments, each of the plurality of control signals further includes S bit values for representing a first starting command, where S is a positive value. The feedback signal outputted by each of the plurality of fans further includes the S bit values for representing the first starting command. The S bit values representing the first starting command appear earlier than the D bit values representing the identification code of each of the plurality of fans and later than the P bit values representing the preamble.

In certain embodiments, each of the plurality of control signals further includes A bit values for representing a first parity checksum code, where A is a positive value. The feedback signal outputted by each of the plurality of fans further includes the A bit values for representing the first parity checksum code. The A bit values representing the first parity checksum code appear later than the D bit values representing the identification code of each of the plurality of fans.

In certain embodiments, each of the plurality of control signals further includes T bit values for representing a first stopping command, where T is a positive value. The feedback signal outputted by each of the plurality of fans further includes the T bit values for representing the first stopping command. The T bit values representing the first stopping command appear later than the A bit values representing the first parity checksum code.

In certain embodiments, each of the plurality of control signals further includes Q bit values for representing a second starting command, where Q is a positive value. The feedback signal outputted by each of the plurality of fans further includes the Q bit values for representing the second starting command. The Q bit values representing the second starting command appear later than the T bit values representing the first stopping command.

In certain embodiments, each of the plurality of control signals further includes V bit values for representing a second parity checksum code, where V is a positive value. The feedback signal outputted by each of the plurality of fans further includes the V bit values for representing the second parity checksum code. The V bit values representing the second parity checksum code appear later than the Q bit values representing the second starting command.

In certain embodiments, each of the plurality of control signals further includes Y bit values for representing a second stopping command, where Y is a positive value. The feedback signal outputted by each of the plurality of fans further includes the Y bit values for representing the second stopping command. The Y bit values representing the second stopping command appear later than the V bit values representing the second parity checksum code.

In certain embodiments, each of the plurality of control signals further includes R bit values for representing address information, where R is a positive value. The feedback signal outputted by each of the plurality of fans further includes the R bit values for representing the address information. The R bit values representing the address information appear later than the Q bit values representing the second starting command and earlier than the V bit values representing the second parity checksum code.

In certain embodiments, one of the plurality of control signals further includes N bit values for representing the reading command, where N is a positive value. Another of the plurality of control signals further includes M bit values for representing the writing command, where M is a positive value. The N bit values representing the reading command and the M bit values representing the writing command appear later than the R bit values representing the address information and earlier than the V bit values representing the second parity checksum code.

In certain embodiments, each of the plurality of control signals further includes W bit values for representing information transmitted between the controller and each of the plurality of fans, where W is a positive value. The feedback signal outputted by each of the plurality of fans further includes the W bit values for representing the information transmitted between the controller and each of the plurality of fans. The W bit values representing the information transmitted between the controller and each of the plurality of fans appear later than the N bit values representing the reading command or the M bit values representing the writing command. The W bit values representing the information transmitted between the controller and each of the plurality of fans appear earlier than the V bit values representing the second parity checksum code.

In certain embodiments, each of the plurality of control signals further includes B bit values for representing a third parity checksum code, where B is a positive value. The feedback signal outputted by each of the plurality of fans further includes the B bit values for representing the third parity checksum code. The B bit values representing the third parity checksum code appear later than the N bit values representing the reading command or the M bit values for representing the writing command. The B bit values representing the third parity checksum code appear earlier than the W bit values representing the information transmitted between the controller and each of the plurality of fans.

In certain embodiments, each of the plurality of control signals further includes U bit values for representing a third stopping command, where U is a positive value. The feedback signal outputted by each of the plurality of fans further includes the U bit values for representing the third stopping command. The U bit values representing the third stopping command appear later than the B bit values representing the third parity checksum code, and earlier than the W bit values representing the information transmitted between the controller and each of the plurality of fans.

In certain embodiments, each of the plurality of control signals further includes Z bit values for representing a third starting command, where Z is a positive value. The feedback signal outputted by each of the plurality of fans further includes the Z bit values for representing the third starting command. The Z bit values representing the third starting command appear later than the U bit values representing the third stopping command, and earlier than the W bit values representing the information transmitted between the controller and each of the plurality of fans.

As described above, the present disclosure provides the multi-fan control system. In the multi-fan control system of the present disclosure, the controller outputs the plurality of operation control commands to the plurality of fans to control the plurality of fans to rotate synchronously. It is worth noting that, when the controller controls the plurality of fans to continually rotate, the controller sequentially obtains the operational state data of the plurality of fans, thereby effectively saving time. Then, the controller, according to the obtained operational state data of the plurality of fans, instantly adjusts the plurality of operation control commands for controlling the plurality of fans.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a schematic diagram of commands included in a signal transmitted between a controller and each of a plurality of fans of a multi-fan control system of a second embodiment of the present disclosure;

FIG. 7 is a schematic diagram of commands included in a signal transmitted between a controller and each of a plurality of fans of a multi-fan control system of a third embodiment of the present disclosure;

FIG. 8 is a schematic diagram of commands included in a signal transmitted between a controller and each of a plurality of fans of a multi-fan control system of a fourth embodiment of the present disclosure;

DETAILED DESCRIPTION OF THE EXEMPLARY EMBODIMENTS

Figure 1:
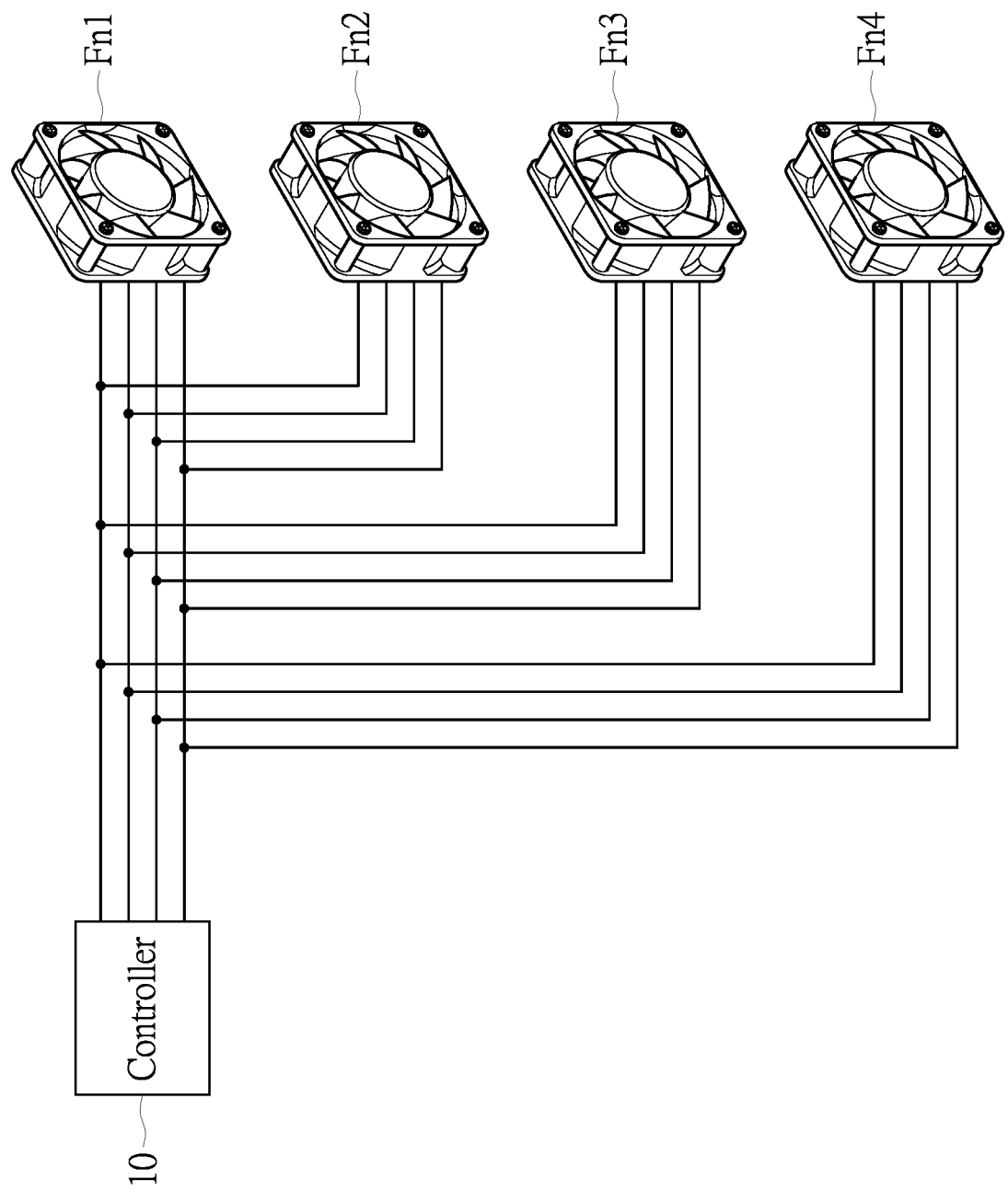
FIG. 1 is a schematic diagram of a multi-fan control system of a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
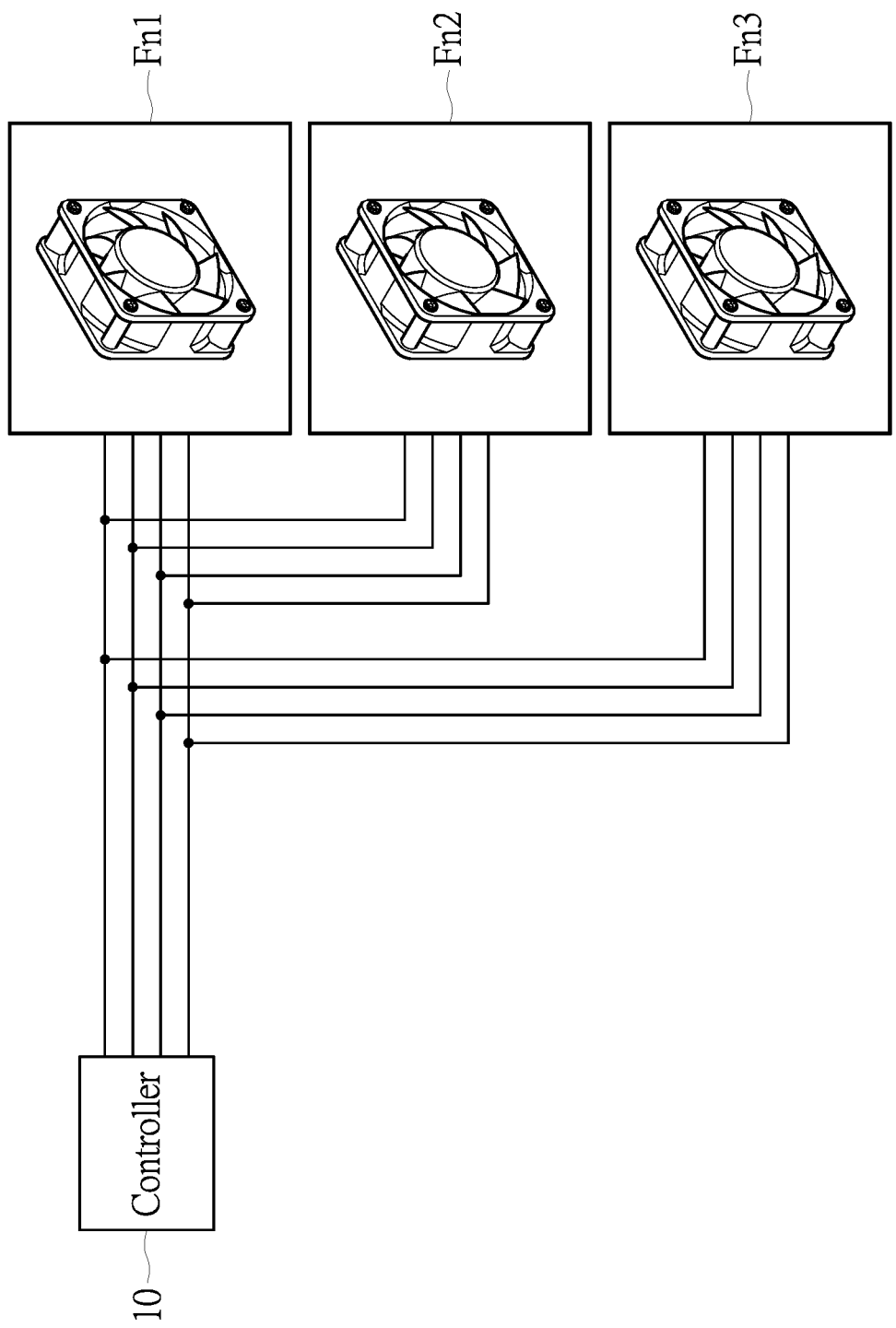
FIG. 2 is a schematic diagram of the multi-fan control system of the first embodiment of the present disclosure.
Figure 3:
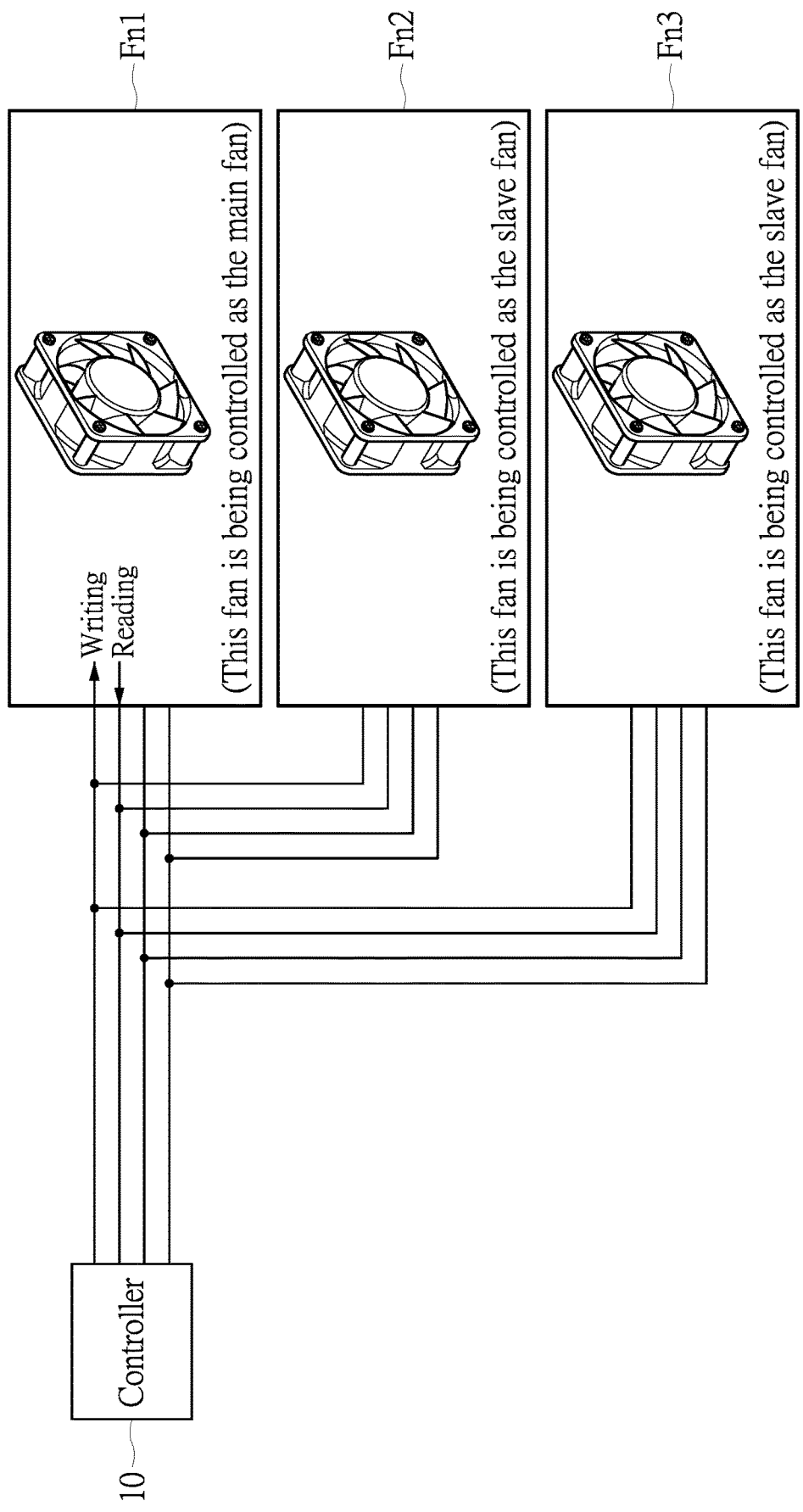
FIG. 3 is a schematic diagram of the multi-fan control system of the first embodiment of the present disclosure.
Figure 4:
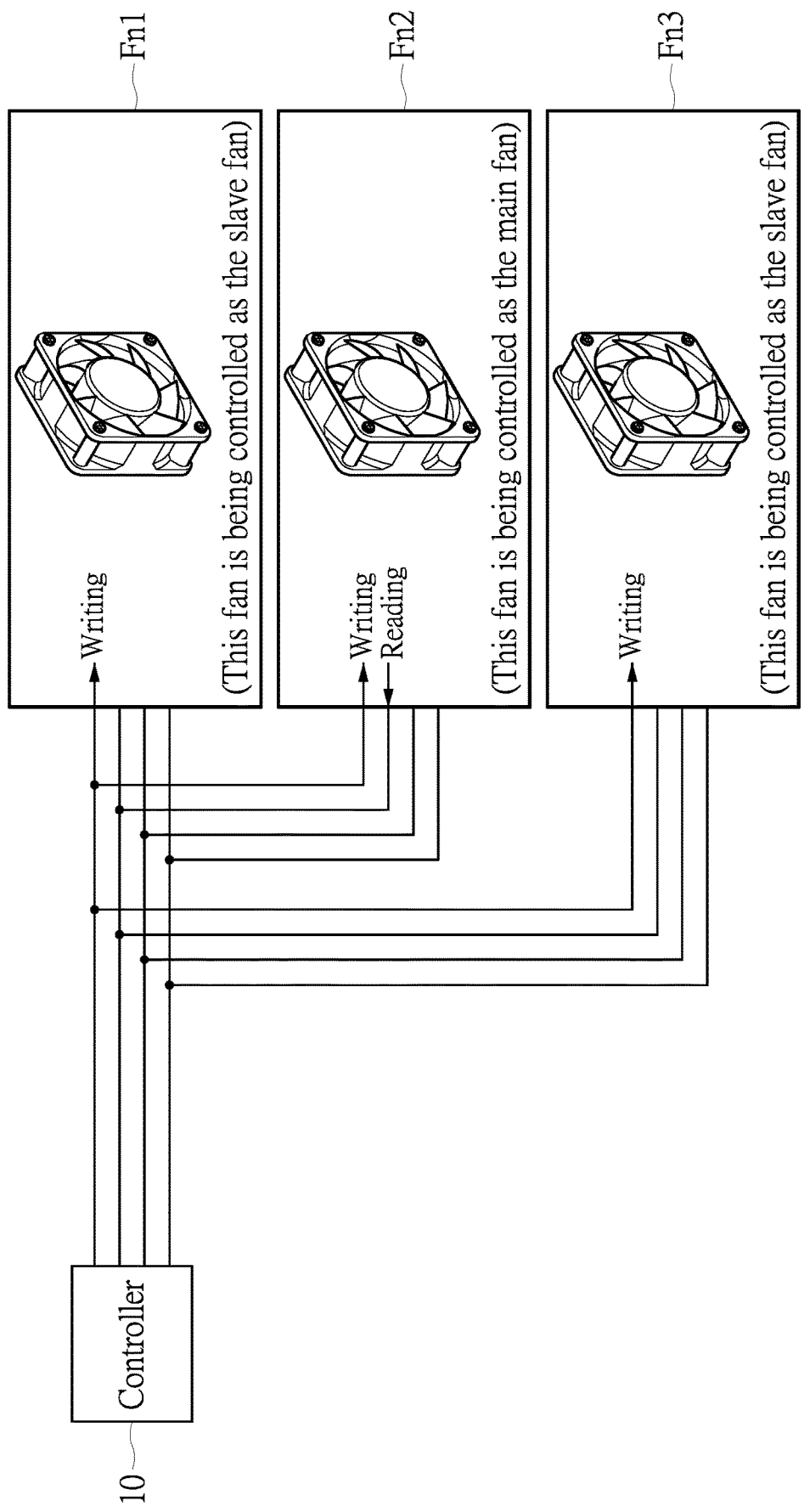
FIG. 4 is a schematic diagram of the multi-fan control system of the first embodiment of the present disclosure.
Figure 5:
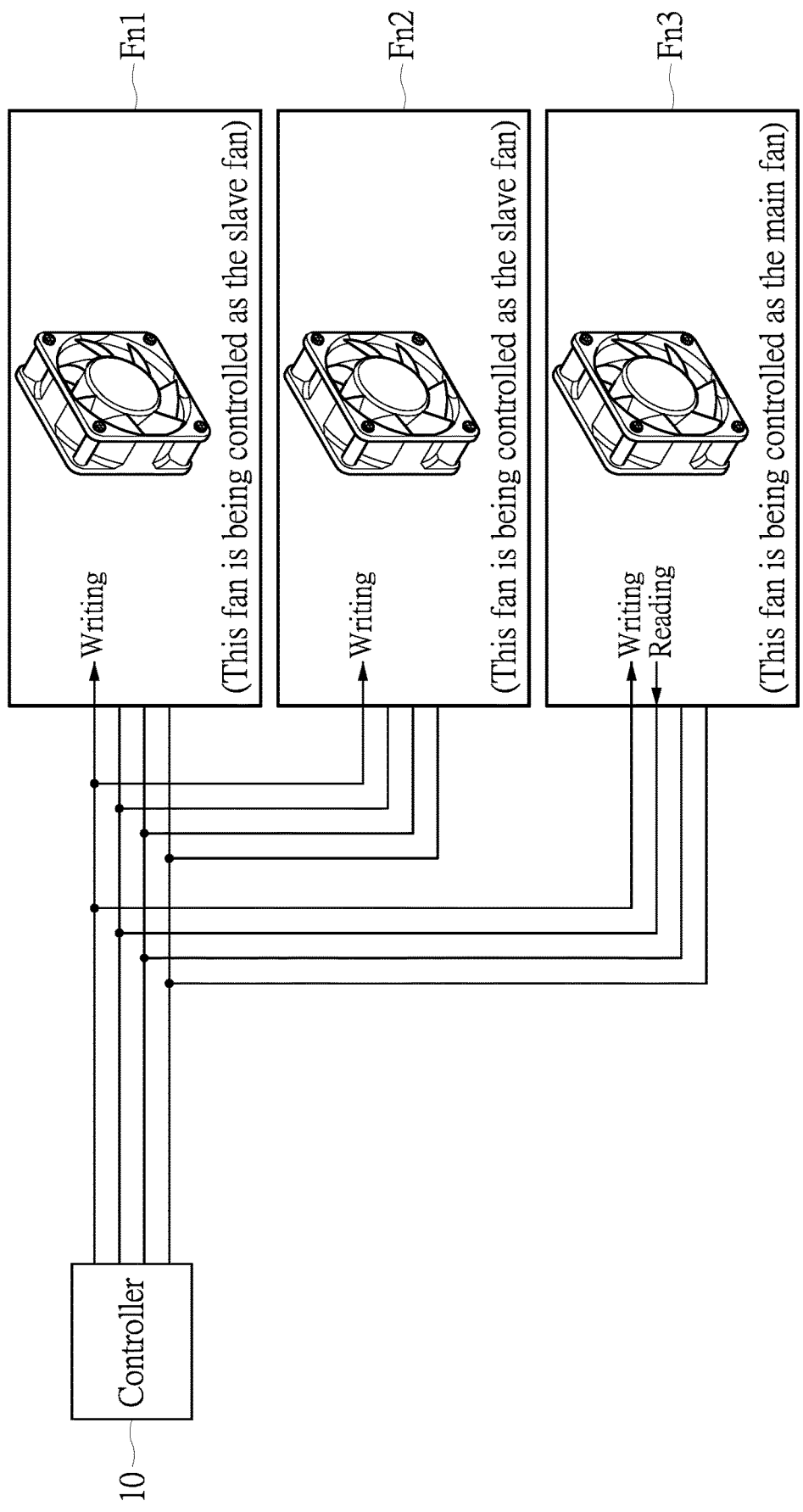
FIG. 5 is a schematic diagram of the multi-fan control system of the first embodiment of the present disclosure.

Reference is made to FIGS. 1 to 5, in which FIG. 1 is a schematic diagram of a multi-fan control system of a first embodiment of the present disclosure, FIG. 2 is a schematic diagram of the multi-fan control system of the first embodiment of the present disclosure, and FIGS. 3 to 5 are schematic diagrams of the multi-fan control system of the first embodiment of the present disclosure.

The multi-fan control system of the present disclosure includes a controller 10, and a plurality of fans such as, but not limited to, four fans Fn1 to Fn4 as shown in FIG. 1 or three fans Fn1 to Fn3 as shown in FIGS. 2 to 5. The controller 10 is configured to control the plurality of fans. In practice, the number of the fans controlled by the controller 10 of the multi-fan control system of the present disclosure may be different from that shown in FIG. 1 or FIGS. 2 to 5.

As is well known by those skilled in the art, in each of the plurality of fans controlled by the controller 10 of the multi-fan control system of the present disclosure, a motor for driving blades of each of the plurality of fans, a motor driver for driving the motor to rotate, a storing component, and other circuit components are disposed. For ease of illustration, a "fan" is taken as a whole in the following description based on such a general configuration, without delving into details relating to individual circuit components thereof.

The controller 10 is connected to the plurality of fans through a plurality of wires at the same time, and signals are synchronously or asynchronously transmitted between the controller 10 and the plurality of fans. For example, the controller 10 is connected to each of the four fans Fn1 to Fn4 through four wires as shown in FIG. 1, or the controller 10 is connected to each of the three fans Fn1 to Fn3 through four wires as shown in FIGS. 2 to 5, but the present disclosure is not limited thereto.

The controller 10 of the multi-fan control system of the present disclosure may, within each of a plurality of time intervals, output a plurality of control signals respectively to the plurality of fans for controlling the plurality of fans synchronously. The control signals respectively outputted to the plurality of fans by the controller 10 are different from each other.

It is worth noting that, within each of the plurality of time intervals, only one of the plurality of control signals that are respectively outputted to the plurality of fans by the controller 10 includes a reading command. Within each of the plurality of time intervals, another of the plurality of control signals that are respectively outputted to the plurality of fans by the controller 10 includes a writing command instead of the reading command.

Within each of the plurality of time intervals, only the one of the plurality of fans that receives the reading command from the controller 10 provides a feedback signal to the controller 10 according to operational state data of the one of the plurality of fans, and the controller 10 reads the operational state data of the one of the plurality of fans. If necessary, within each of the plurality of time intervals, the operation control command may be written in the one of the plurality of fans that receives the reading command from the controller 10.

In contrast, within each of the plurality of time intervals, another of the plurality of fans receives and stores the writing command and the operation control command from the controller 10. The another of the plurality of fans operates according to the operation control command, but does not provide operational state data thereof to the controller 10.

That is, the controller 10 of the multi-fan control system of the present disclosure may obtain the operational state data of the plurality of fans sequentially within the plurality of time intervals. The controller 10 may synchronously obtain the operational state data of one of the plurality of fans and output the operation control commands to the plurality of fans within each of the plurality of time intervals.

For example, as shown in FIG. 3, the controller 10 only reads the operational state data of the fan Fn1, but does not read the operational state data of the fans Fn2 and Fn3, within one of the plurality of time intervals. At the same time, the controller 10 may write the operation control commands respectively to the fans Fn2 and Fn3 in practice. Accordingly, the fan Fn1 is controlled as a main fan, and the fans Fn2 and Fn3 are controlled as slave fans, within the one of the plurality of time intervals.

For example, as shown in FIG. 4, the controller 10 only reads the operational state data of the fan Fn2, but does not read the operational state data of the fans Fn1 and Fn3, within a next one of the plurality of time intervals. At the same time, the controller 10 writes the operation control commands respectively to the fans Fn1 to Fn3. Accordingly, the fan Fn2 is controlled as the main fan, and the fans Fn1 and Fn3 are controlled as the slave fans, within the next one of the plurality of time intervals.

For example, as shown in FIG. 5, the controller 10 only reads the operational state data of the fan Fn3, but does not read the operational state data of the fans Fn1 and Fn2, within yet another one of the plurality of time intervals. In addition, the controller 10 writes the operation control commands respectively to the fans Fn1 to Fn3 within the yet another one of the plurality of time intervals. Accordingly, the fan Fn3 is controlled as the main fan, and the fans Fn1 and Fn2 are controlled as the slave fans, within the yet another one of the plurality of time intervals.

In other words, within each of the plurality of time intervals, the controller 10 of the multi-fan control system of the present disclosure selects one of the plurality of fans as the main fan and only reads the operational state data of the main fan, but does not read the operational state data of the slave fans. At the same time, the controller 10 may output the operation control commands respectively to the plurality of fans to control the plurality of fans to rotate. When the controller 10 controls the plurality of fans to operate, the controller 10 sequentially obtains the operational state data of the plurality of fans. Then, the controller 10 may adjust the operation control commands outputted to the plurality of fans according to the operational state data of the plurality of fans. Therefore, the controller 10 of the multi-fan control system of the present disclosure is capable of effectively controlling operational states of (motors of) the plurality of fans without affecting rotation of the plurality of fans.

Reference is made to FIG. 6, which is a schematic diagram of commands included in a signal transmitted between a controller and each of a plurality of fans of a multi-fan control system of a second embodiment of the present disclosure.

Within each of the plurality of time intervals, the controller (such as the controller 10 as shown in FIGS. 1 to 5) of the multi-fan control system of the present disclosure may output the plurality of control signals respectively to the plurality of fans (such as, but not limited to, the plurality of fans Fn1 to Fn4 as shown in FIG. 1 or the plurality of fans Fn1 to Fn3 as shown in FIGS. 2 to 5).

Within each of the plurality of time intervals, one of the plurality of fans that receives the control signal including the reading command provides the feedback signal to the controller according to the operational state data of the one of the plurality of fans. The controller reads the feedback signal of the one of the plurality of fans. The plurality of control signals that are received from the controller respectively by the plurality of fans alternatively include the reading command within the plurality of time intervals. As a result, the plurality of fans provide the feedback signals to the controller according to the operational state data thereof respectively within the plurality of time intervals. The controller reads the feedback signals that are outputted respectively by the plurality of fans respectively within the plurality of time intervals.

In the second embodiment, each or any one of a plurality of signals (such as the control signals and the feedback signals as described herein) transmitted between the controller and the plurality of fans of the multi-fan control system of the present disclosure may include a plurality of bit values representing commands, messages and so on.

The plurality of bit values included in each or any one of the plurality of signals (such as the control signals and the feedback signals as described herein) may be represented by parameters of a plurality of waveforms. For example, in the control signals and/or the feedback signals, the bit value "1" is represented by one of the plurality of waveforms that is at a high (voltage or logic) level, and the bit value "0" is represented by one of the plurality of waveforms that is at a low (voltage or logic) level.

As shown in FIG. 6, in the second embodiment, each or any one of the plurality of signals (such as the control signals and the feedback signals as described herein) transmitted between the controller and the plurality of fans of the multi-fan control system of the present disclosure includes P bit values for representing a preamble, where P is a positive value. The P bit values representing the preamble appear earlier than other bit values in the one of the plurality of signals transmitted between the controller and the plurality of fans of the multi-fan control system. For example, the controller sets the preamble to be represented by six (P=6) bit values "10101", but the present disclosure is not limited thereto.

When each of the plurality of fans receives the control signal from the controller, each of the plurality of fans may determine whether or not P bit values that appear earliest among the plurality of bit values in the received control signal are the same as the preamble. Accordingly, each of the plurality of fans determines whether or not the received control signal is outputted by the controller, and determines whether or not the P bit values included in the received control signal represent the preamble. After each of the plurality of fans read the preamble, each of the plurality of fans may determine time points at which others bit values appear with respect to the P bit values representing the preamble in the control signal.

As shown in FIG. 6, in the second embodiment, each or any one of the plurality of signals (such as the control signals and the feedback signals as described herein) transmitted between the controller and the plurality of fans of the multi-fan control system of the present disclosure further includes S bit values for representing a first starting command, where S is a positive value. The S bit values representing the first starting command appear later than the P bit values representing the preamble. For example, the controller sets the first starting command to be represented by one (P=1) bit value "0" or "1," but the present disclosure is not limited thereto.

In the second embodiment, each or any one of the plurality of signals (such as the control signals and the feedback signals as described herein) transmitted between the controller and the plurality of fans of the multi-fan control system of the present disclosure further includes D bit values for representing an identification code of each of the plurality of fans, where D is a positive value. The D bit values representing the identification code of each of the plurality of fans appear later than the S bit values representing the first starting command. The identification codes of the plurality of fans are different from each other.

Each of the plurality of fans may determine whether or not D bit values that appear later than the P bit values representing the preamble and the S bit values representing the first starting command in the received control signal are the same as the D bit values representing the identification code of each of the plurality of fans to determine whether or not the received control signal from the controller is a correct control signal.

In the second embodiment, each or any one of the plurality of signals (such as the control signals and the feedback signals as described herein) transmitted between the controller and the plurality of fans of the multi-fan control system of the present disclosure further includes A bit values for representing a first parity checksum code, where A is a positive value. The A bit values representing the first parity checksum code appear later than the S bit values representing the first starting command.

In the second embodiment, each or any one of the plurality of signals (such as the control signals and the feedback signals as described herein) transmitted between the controller and the plurality of fans of the multi-fan control system of the present disclosure further includes T bit values for representing a first stopping command, where T is a positive value. The T bit values representing the first stopping command appear later than the A bit values representing the first parity checksum code.

In the second embodiment, each or any one of the plurality of signals (such as the control signals and the feedback signals as described herein) transmitted between the controller and the plurality of fans of the multi-fan control system of the present disclosure further includes Q bit values for representing a second starting command, where Q is a positive value. The Q bit values representing the second starting command appear later than the T bit values representing the first stopping command.

In the second embodiment, each or any one of the plurality of signals (such as the control signals and the feedback signals as described herein) transmitted between the controller and the plurality of fans of the multi-fan control system of the present disclosure further includes W bit values for representing information, where W is a positive value. The W bit values representing the information such as the operation control command outputted to each of the plurality of fans by the controller appear later than the Q bit values representing the second starting command.

In the second embodiment, each or any one of the plurality of signals (such as the control signals and the feedback signals as described herein) transmitted between the controller and the plurality of fans of the multi-fan control system of the present disclosure further includes V bit values for representing a second parity checksum code, where V is a positive value. The V bit values representing the second parity checksum code appear later than the W bit values representing information and the Q bit values representing the second starting command.

In the second embodiment, each or any one of the plurality of signals (such as the control signals and the feedback signals as described herein) transmitted between the controller and the plurality of fans of the multi-fan control system of the present disclosure further includes Y bit values for representing a second stopping command, where Y is a positive value. The Y bit values representing the second stopping command appear later than V bit values representing the second parity checksum code.

Reference is made to FIG. 7, which is a schematic diagram of commands included in a signal transmitted between a controller and each of a plurality of fans of a multi-fan control system of a third embodiment of the present disclosure. Descriptions that are the same as those in the second embodiment of the present disclosure are not repeated herein.

Differences between the third and second embodiments of the present disclosure are described in the following.

In the third embodiment, each or any one of the signals transmitted between the controller and the plurality of fans of the multi-fan control system of the present disclosure does not include the W bit values representing the information (such as the operational state data of the fan).

In the third embodiment, each or any one of the signals (such as the control signals and the feedback signals as described herein) transmitted between the controller and the plurality of fans of the multi-fan control system of the present disclosure further include R bit values for representing address information of a register or other storing component of the controller or the fan, where R is a positive value. The R bit values representing the address information appear later than the Q bit values representing the second starting command.

The controller of the multi-fan control system of the third embodiment of the present disclosure sets the reading command to be represented by N bit values included in the control signal outputted to one of the plurality of fans, and sets the writing command to be represented by M bit values included in the control signal outputted to another of the plurality of fans, where N and M are positive values. The controller sets the N bit values representing the reading command and the M bit values representing the writing command to appear later than the R bit values representing the address information and earlier than the V bit values representing the second parity checksum code.

For example, the reading command and the writing command may be represented by a value at a same one of a plurality of bits included in the control signal. If the value at the same one of the plurality of bits in the control signal is "1" (which may be replaced with "0" in practice), the control signal includes the reading command. If the value at the same one of the plurality of bits in the control signal is "0" (which may be replaced with "1" in practice), the control signal includes the writing command.

Reference is made to FIG. 8, which is a schematic diagram of commands included in a signal transmitted between a controller and each of a plurality of fans of a multi-fan control system of a fourth embodiment of the present disclosure. Descriptions that are the same as those in the fourth embodiment of the present disclosure are not repeated herein.

A difference between the second to fourth embodiments of the present disclosure is that, the signals transmitted between the controller and the plurality of fans of the multi-fan control system of the fourth embodiment of the present disclosure include more bit values, as described in the following.

In the fourth embodiment, each or any one of the signals (such as the control signals and the feedback signals as described herein) transmitted between the controller and the plurality of fans of the multi-fan control system of the present disclosure further include B bit values for representing a third parity checksum code, where B is a positive value. The B bit values representing the third parity checksum code appear later than the N bit values representing the reading command or the M bit values representing the writing command, and appear earlier than the V bit values representing the second parity checksum code.

In the fourth embodiment, each or any one of the signals (such as the control signals and the feedback signals as described herein) transmitted between the controller and the plurality of fans of the multi-fan control system of the present disclosure further include U bit values for representing a third stopping command, where U is a positive value. The U bit values representing the third stopping command appear later than the B bit values representing the third parity checksum code and earlier than the V bit values representing the second parity checksum code.

In the fourth embodiment, each or any one of the signals (such as the control signals and the feedback signals as described herein) transmitted between the controller and the plurality of fans of the multi-fan control system of the present disclosure further include Z bit values for representing a third starting command, where Z is a positive value. The Z bit values representing the third starting command appear later than the U bit values representing the third stopping command, and appear earlier than the W bit values representing the information such as the operation control command.

Figure 9:
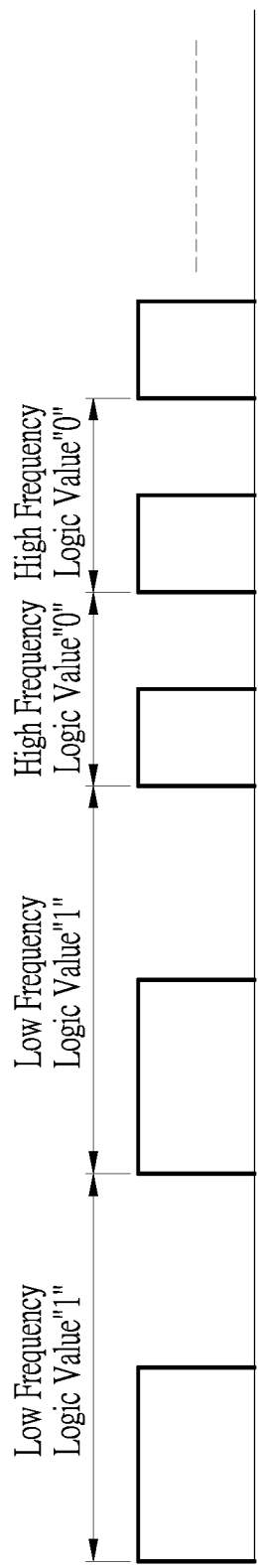
FIG. 9 is a schematic diagram of frequencies of a plurality of waveforms of a signal that are modulated by a multi-fan control system of a fifth embodiment of the present disclosure.

Reference is made to FIG. 9, which is a schematic diagram of frequencies of a plurality of waveforms of a signal that are modulated by a multi-fan control system of a fifth embodiment of the present disclosure.

The controller (such as the controller 10 as shown in FIGS. 1 to 5) of the multi-fan control system of the present disclosure outputs the plurality of control signals respectively to the plurality of fans (such as, but not limited to, the fans Fn1 to Fn4 as shown in FIG. 1 or the fans Fn1 to Fn3 as shown in FIGS. 2 to 5).

The controller of the multi-fan control system of the fifth embodiment of the present disclosure sets the reading command to be represented by parameters and an order of appearance of N ones of the plurality of waveforms of one of the plurality of control signals, where N is a positive value. The controller of the multi-fan control system of the fifth embodiment of the present disclosure sets the writing command to be represented by parameters and an order of appearance of M ones of the plurality of waveforms of another of the plurality of control signals, where M is a positive value.

For example, the controller of the multi-fan control system of the present disclosure sets the reading command to be represented by frequencies and the order of the appearance of the N ones of the plurality of waveforms of the one of the plurality of control signals. For example, the controller of the multi-fan control system of the present disclosure sets the writing command to be represented by frequencies and the order of the appearance of the M ones of the plurality of waveforms of the one of the plurality of control signals.

For example, as shown in FIG. 9, among the plurality of waveforms of each or any one of the signals (such as the control signals and the feedback signals as described herein) transmitted between the controller and the plurality of fans of the multi-fan control system of the fifth embodiment of the present disclosure, the bit value "1" is represented by the waveform having a first frequency (such as a low frequency), and the bit value "0" is represented by the waveform having a second frequency (such as a high frequency), but the present disclosure is not limited thereto.

The plurality of fans may rotate respectively according to working periods of the plurality of waveforms of the control signals from the controller. At the same time, the plurality of fans may determine the messages and the commands such as the reading command and the writing command respectively according to the parameters (such as the frequencies) of some of the plurality of waveforms of the control signals from the controller.

Figure 10:
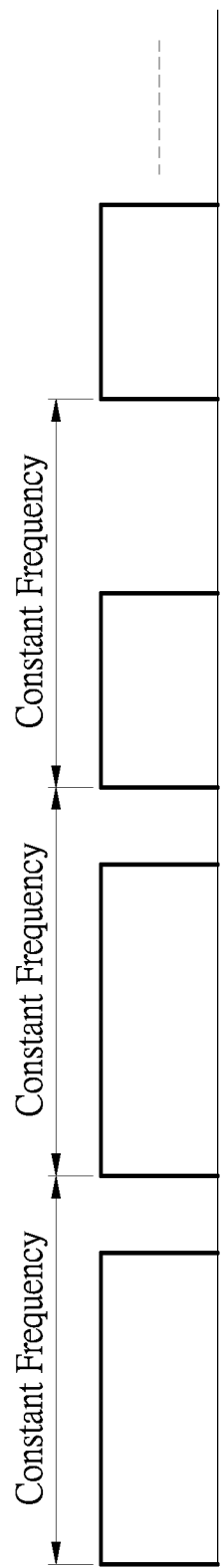
FIG. 10 is a schematic diagram of working periods of a plurality of waveforms of a signal that are modulated by a multi-fan control system of a sixth embodiment of the present disclosure.

Reference is made to FIG. 10, which is a schematic diagram of working periods of a plurality of waveforms of a signal that are modulated by a multi-fan control system of a sixth embodiment of the present disclosure.

Within each of the plurality of time intervals, one of the plurality of fans that receives the control signal including the reading command provides the feedback signal to the controller according to the operational state data of the one of the plurality of fans, and the controller reads the feedback signal of the one of the plurality of fans.

For example, as shown in FIG. 10, in the sixth embodiment, the bit value "1" is represented by any one of the plurality of waveforms that has a first working period (such as 75%) in the feedback signal, the bit value "0" is represented by any one of the plurality of waveforms that has a second working period (such as 50%) in the feedback signal, and the frequencies of the plurality of waveforms of the feedback signal are equal to each other, but the present disclosure is not limited thereto.

It should be understood that, the other commands and messages as described above may be represented by the first working period and the second working period of the feedback signal.

In conclusion, the present disclosure provides the multi-fan control system. In the multi-fan control system of the present disclosure, the controller outputs the plurality of operation control commands to the plurality of fans to control the plurality of fans to rotate synchronously. It is worth noting that, when the controller controls the plurality of fans to continually rotate, the controller sequentially obtains the operational state data of the plurality of fans, thereby effectively saving time. Then, the controller, according to the obtained operational state data of the plurality of fans, instantly adjusts the plurality of operation control commands for controlling the plurality of fans.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-fan control system, comprising:
a controller configured to output a plurality of control signals within each of a plurality of time intervals; and
a plurality of fans connected to the controller;
wherein, one of the plurality of control signals that are respectively outputted to the plurality of fans by the controller within each of the plurality of time intervals includes a reading command, and another of the plurality of control signals that are outputted respectively to the plurality of fans by the controller within each of the plurality of time intervals includes a writing command and an operation control command;
wherein, within each of the plurality of time intervals, only one of the plurality of fans that receives the reading command provides a feedback signal to the controller according to operational state data of the one of the plurality of fans, and the controller reads the operational state data of the one of the plurality of fans;
wherein the controller reads the operational state data of the plurality of fans respectively within the plurality of time intervals;

wherein, within each of the plurality of time intervals, the another of the plurality of fans receives and stores the writing command and the operation control command from the controller.

2. The multi-fan control system according to claim 1, wherein, within each of the plurality of time intervals, the one of the plurality of fans that receives the reading command also receives and stores the operation control command from the controller.

3. The multi-fan control system according to claim 1, wherein the controller sets the reading command to be represented by parameters of N ones of a plurality of waveforms of the one of the plurality of control signals, and the controller sets the writing command to be represented by parameters of M ones of a plurality of waveforms of the another of the plurality of control signals, where N and M are positive values.

4. The multi-fan control system according to claim 1, wherein the controller sets the reading command to be represented by frequencies of N ones of a plurality of waveforms of the one of the plurality of control signals, and the controller sets the writing command to be represented by frequencies of M ones of a plurality of waveforms of the another of the plurality of control signals, where N and M are positive values.

5. The multi-fan control system according to claim 4, wherein each of the plurality of fans rotates according to working periods of the plurality of waveforms of the control signal from the controller, and determines whether or not the control signal from the controller includes the reading command or the writing command according to the frequencies of some of the plurality of waveforms of the control signal from the controller.

6. The multi-fan control system according to claim 1, wherein, within each of the plurality of time intervals, one of the plurality of fans that receives the reading command sets the operational state data of the one of the plurality of fans to be represented by working periods of F ones of a plurality of waveforms of the feedback signal, where F is a positive value.

7. The multi-fan control system according to claim 1, wherein each of the plurality of control signals includes P bit values for representing a preamble, and the feedback signal outputted by each of the plurality of fans includes the P bit values for representing the preamble, where P is a positive value.

8. The multi-fan control system according to claim 7, wherein the controller sets an identification code of each of the plurality of fans to be represented by D bit values included in the control signal outputted to each of the plurality of fans, the identification code of each of the plurality of fans is represented by the D bit values included in the feedback signal outputted by each of the plurality of fans, the D bit values representing the identification code of each of the plurality of fans appear later than the P bit values representing the preamble, and the identification codes of the plurality of fans are different from each other, where D is a positive value.

9. The multi-fan control system according to claim 8, wherein each of the plurality of control signals further includes S bit values for representing a first starting command, the feedback signal outputted by each of the plurality of fans further includes the S bit values for representing the first starting command, and the S bit values representing the first starting command appear earlier than the D bit values representing the identification code of each of the plurality of fans and later than the P bit values representing the preamble, where S is a positive value.

10. The multi-fan control system according to claim 9, wherein each of the plurality of control signals further includes A bit values for representing a first parity checksum code, the feedback signal outputted by each of the plurality of fans further includes the A bit values for representing the first parity checksum code, and the A bit values representing the first parity checksum code appear later than the D bit values representing the identification code of each of the plurality of fans, where A is a positive value.

11. The multi-fan control system according to claim 10, wherein each of the plurality of control signals further includes T bit values for representing a first stopping command, the feedback signal outputted by each of the plurality of fans further includes the T bit values for representing the first stopping command, and the T bit values representing the first stopping command appear later than the A bit values representing the first parity checksum code, where T is a positive value.

12. The multi-fan control system according to claim 11, wherein each of the plurality of control signals further includes Q bit values for representing a second starting command, the feedback signal outputted by each of the plurality of fans further includes the Q bit values for representing the second starting command, and the Q bit values representing the second starting command appear later than the T bit values representing the first stopping command, where Q is a positive value.

13. The multi-fan control system according to claim 12, wherein each of the plurality of control signals further includes V bit values for representing a second parity checksum code, the feedback signal outputted by each of the plurality of fans further includes the V bit values for representing the second parity checksum code, and the V bit values representing the second parity checksum code appear later than the Q bit values representing the second starting command, where V is a positive value.

14. The multi-fan control system according to claim 13, wherein each of the plurality of control signals further includes Y bit values for representing a second stopping command, the feedback signal outputted by each of the plurality of fans further includes the Y bit values for representing the second stopping command, and the Y bit values representing the second stopping command appear later than the V bit values representing the second parity checksum code, where Y is a positive value.

15. The multi-fan control system according to claim 14, wherein each of the plurality of control signals further includes R bit values for representing address information, the feedback signal outputted by each of the plurality of fans further includes the R bit values for representing the address information, and the R bit values representing the address information appear later than the Q bit values representing the second starting command and earlier than the V bit values representing the second parity checksum code, where R is a positive value.

16. The multi-fan control system according to claim 15, wherein one of the plurality of control signals further includes N bit values for representing the reading command, another of the plurality of control signals further includes M bit values for representing the writing command, and the N bit values representing the reading command and the M bit values representing the writing command appear later than the R bit values representing the address information and earlier than the V bit values representing the second parity checksum code, where N and M are positive values.

17. The multi-fan control system according to claim 16, wherein each of the plurality of control signals further includes W bit values for representing information transmitted between the controller and each of the plurality of fans, the feedback signal outputted by each of the plurality of fans further includes the W bit values for representing the information transmitted between the controller and each of the plurality of fans, the W bit values representing the information transmitted between the controller and each of the plurality of fans appear later than the N bit values representing the reading command or the M bit values representing the writing command, and the W bit values representing the information transmitted between the controller and each of the plurality of fans appear earlier than the V bit values representing the second parity checksum code, where W is a positive value.

18. The multi-fan control system according to claim 17, wherein each of the plurality of control signals further includes B bit values for representing a third parity checksum code, the feedback signal outputted by each of the plurality of fans further includes the B bit values for representing the third parity checksum code, the B bit values representing the third parity checksum code appear later than the N bit values representing the reading command or the M bit values for representing the writing command, and the B bit values representing the third parity checksum code appear earlier than the W bit values representing the information transmitted between the controller and each of the plurality of fans, where B is a positive value.

19. The multi-fan control system according to claim 18, wherein each of the plurality of control signals further includes U bit values for representing a third stopping command, the feedback signal outputted by each of the plurality of fans further includes the U bit values for representing the third stopping command, and the U bit values representing the third stopping command appear later than the B bit values representing the third parity checksum code and earlier than the W bit values representing the information transmitted between the controller and each of the plurality of fans, where U is a positive value.

20. The multi-fan control system according to claim 19, wherein each of the plurality of control signals further includes Z bit values for representing a third starting command, the feedback signal outputted by each of the plurality of fans further includes the Z bit values for representing the third starting command, and the Z bit values representing the third starting command appear later than the U bit values representing the third stopping command and earlier than the W bit values representing the information transmitted between the controller and each of the plurality of fans, where Z is a positive value.

* * * * *